United States Patent [19]

Bowen

[11] 4,246,784

[45] Jan. 27, 1981

[54] PASSIVE REMOTE TEMPERATURE SENSOR SYSTEM

[76] Inventor: Theodore Bowen, 1202 Calle Gardenias, Tucson, Ariz. 85705

[21] Appl. No.: 44,743

[22] Filed: Jun. 1, 1979

[51] Int. Cl.³ ............................................. G01K 1/00
[52] U.S. Cl. ................................ 73/339 A; 128/736; 128/773
[58] Field of Search ............ 73/339 A, 359 A, 359 R; 128/736, 773

[56] References Cited

PUBLICATIONS

"Subcutaneous Temperatures: A Method of Non-Invasive Sensing," Science, vol. 190, Nov. 1975, pp. 669–671.
"Atmospheric Absorption Measurements with a Microwave Radiometer," Physical Review, vol. 70, 9–1946, pp. 340–347.
Journal of the Optical Society of America, vol. 49, #10, 10–1959, pp. 1004–1007.
Journal of Geophysical Research, vols. 67, 68, pp. 4259 et seq., and 1683–1703, respectively, 1962, 1963.

Primary Examiner—Donald O. Woodiel
Attorney, Agent, or Firm—Ferguson, Baker and Whitham

[57] ABSTRACT

Passive non-invasive temperature measurement of the interior of a body is accomplished by using the acoustic thermal noise spectra of the body. One or more acoustic transducers are coupled with the surface of the body to intercept the acoustical noise signal from within the interior of the body along well defined paths to generate a corresponding electrical signal. The noise power spectrum of the electrical signal is analyzed by means of a power spectrum analyzer to develop an output representing the temperature-depth distribution along said paths. The output of the power spectrum analyzer may be displayed and/or recorded or subjected to further signal processing.

22 Claims, 4 Drawing Figures

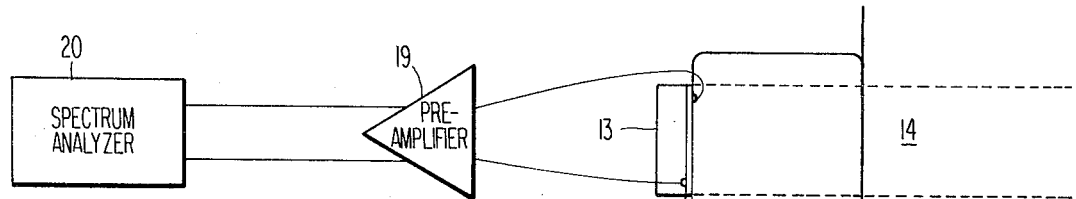
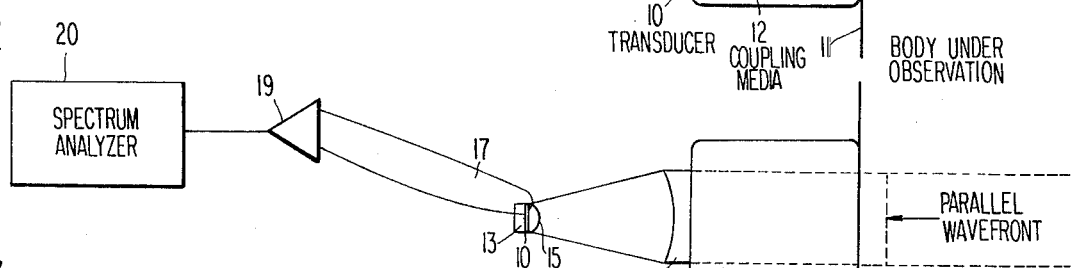
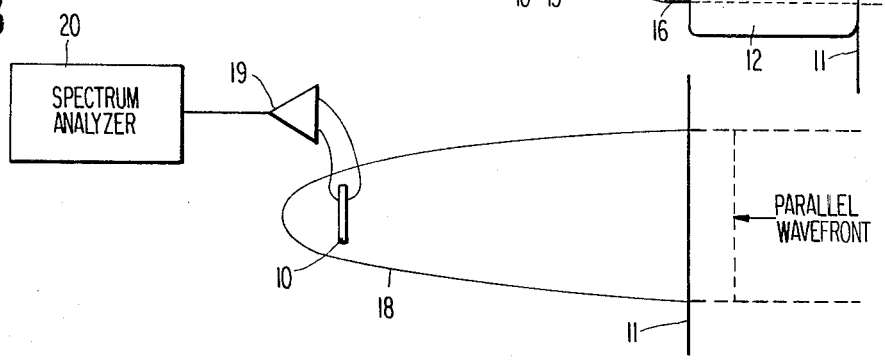
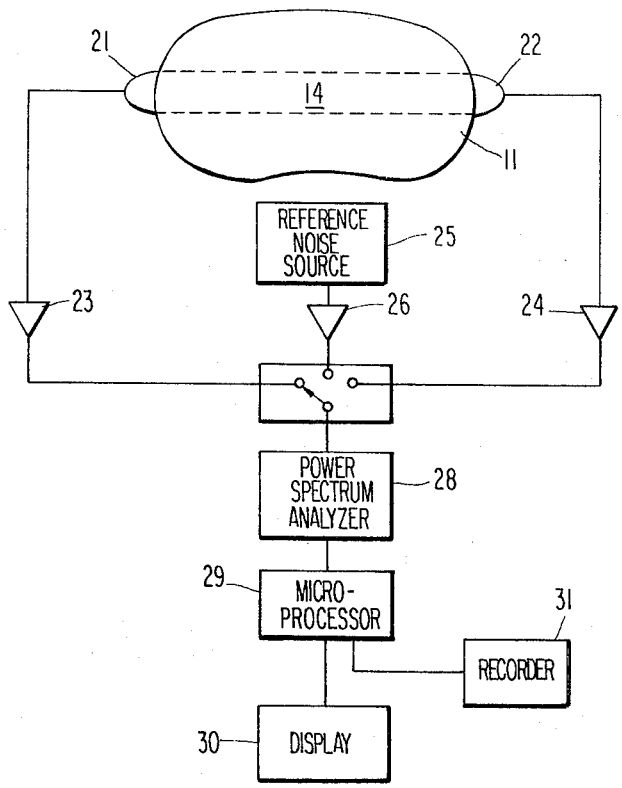

PASSIVE REMOTE TEMPERATURE SENSOR SYSTEM

BACKGROUND OF THE INVENTION

The subject invention generally relates to the measurement of temperatures within a body, and more particularly to a system of temperature measurement by monitoring the pressure fluctuations due to thermal vibrations in the body as a function of frequency.

There are many situations in medical diagnosis and treatment, industrial processing, geophysical exploration, and other fields where the temperature inside a material body is desirable to measure, but it is not practical to insert a probe beyond the surface of the body. In medical diagnosis, the usefulness of temperature measurement at the few places available for probe insertion is well established. In recent years, thermograms produced by infrared camera equipment and other surface temperature measurement have shown promise as a means of detecting breast cancer lesions. A technique which extends temperature measurement to all soft-tissue parts of the body offers promise as a powerful new diagnostic tool.

In medical therapy, a non-invasive temperature monitoring technique would be useful in almost any procedure involving heating or cooling of the soft tissues of the body. For example, hyperthermia has been found to be a promising technique, either alone or in combination with other modalities, for the treatment of cancer. However, its effectiveness is very sensitive to the temperature which is reached, becoming more effective as one approaches 45° C., but tissue necrosis becomes a serious problem if the temperature goes above 45° C. Therefore, a non-invasive method of monitoring temperature profiles is important if hyperthermia is to have wider potential.

In industrial processing, a suitable temperature distribution inside a large, hot body is often important during the heat treatment and cooling process. For example, the casting of large thicknesses of glass and other brittle materials is costly, partly because of a high failure rate which might be alleviated by a non-invasive temperature monitoring system. Data needed for geophysical exploration and monitoring would be more readily obtained if non-invasive accoustic-radiometry could provide temperature profiles as a function of depth for distances of several meters into surface rocks or into the region around a bore hole.

SUMMARY OF THE INVENTION

It is, therefore, an object of this invention to make a non-invasive temperature measurement of a body from acoustic thermal noise spectra.

It is another object of the invention to provide a passive remote temperature sensor system for non-invasive temperature measurement of the interior of a body.

It is a further object of the present invention to provide a method of passive, non-invasive temperature measurement of the interior of a body using the acoustic thermal noise spectra radiated from within the body.

The foregoing and other objects of the invention are accomplished by receiving the acoustic thermal noise spectra along one or more well defined paths within the interior of the body. This is conveniently done by coupling one or more acoustic transducers with the surface of the body to intercept the acoustical noise signal from within the interior of the body along said paths. The acoustic transducers convert the received acoustic thermal noise spectra into a corresponding electrical signal. This electrical signal is then analyzed by means of a power spectrum analyzer to develop an output representing the temperature-depth distribution along said paths. The output of the power spectrum analyzer can be displayed and/or recorded or subjected to further signal processing.

BRIEF DESCRIPTION OF THE DRAWINGS

The foregoing and other objects, aspects and advantages of the invention will become better understood from the following detailed description of the invention which makes reference to the accompanying drawing, in which:

FIG. 1 is a block diagram illustrating the practice of the invention using a single transducer coupled to the surface of a body, the interior temperature of which is to be measured;

FIGS. 2 and 3 are block diagrams representing modifications of the basic system shown in FIG. 1 including means for focussing the acoustical noise signal on the transducer; and FIG. 4 is a block diagram of a system according to the invention employing a plurality of acoustic transducers.

DETAILED DESCRIPTION OF THE INVENTION

Acoustic-radiometric temperature sensing is based upon an analogy between electro-magnetic and acoustic (i.e., elastic wave) radiation. It should be understood, however, that electro-magnetic and acoustic waves are entirely different physical phenomena, one being a phenomenum of electric and magnetic fields propagating in empty space, the other being a property of the mechanical motions of material media (solids, liquids, gases). There are many similarities in the mathematics of electro-magnetic and acoustic waves which result in some analogies of behavior.

In the case of electro-magnetic radiation, it is well known that any surface at any absolute temperature $T>0$ emits "black-body" radiation. A broad band of frequencies is emitted from 0 to an upper limit determined by the temperature T. For example, for objects at temperatures in the neighborhood of room temperature, the frequencies extend through radio and microwave frequencies into infrared frequencies. Many temperature measuring systems determine temperature of the surface of a "black-body" by measuring the intensity of all or some portion of the "black-body" spectrum. For example, pyrometers make use of the visible "black-body" radiation, comparing the apparent color of the radiation from the surface of unknown temperature to that of a surface of known temperature. Infrared cameras measure surface temperature by the intensity of infrared emissions. Less well known are microwave radiometers, which determine temperature by measuring the intensity of "black-body" radiation in the microwave frequency region. When only the microwave frequencies are measured, the total intensity is directly proportional to the absolute temperature T of the "black-body" surface. It is possible to measure temperature down to within a few degrees from absolute zero with a microwave radiometer. In fact, the most publicized application of this technique has been the measurement of "cosmic" or extraterrestrial 3° K. "black-body" radiation which is attributed to the remnants of the "big bang" in cosmological theory.

If the surface is "black," e.g. perfectly absorbing, the intensity of the emitted radiation depends only upon the temperature T. The power received at the detecting device depends of course, on the properties of the detector and its geometric arrangement and distance relative to the "black-body" surface. It will be assumed that these properties are known, so that received-power measurements can be interpreted as temperatures. In fact, this is especially simple if the receiving device has a highly directional response in a "beam" region, and if the "black-body" surface extends across the entire beam. When these conditions can be arranged, the received power is unaffected by the relative distances between detector and "black-body" surface or by the orientation of the "black-body" surface (provided only that it intercept the entire beam); hence, the received power can be directly interpreted as a "black-body" temperature. In the case of a microwave radiometer, the directional beam response is achieved by a suitable antenna, often a parabola followed by a conical horn section. In a pyrometer, the optical system provides the directionally characteristic.

Suppose the body which is at temperature T does not appear "black," that is, it does not completely absorb incident radiation. If the fraction absorbed is A, then the intensity of the emitted "black-body" radiation must be the same fraction A of the amount expected for a perfect "black-body." This can be deduced from very general arguments based upon the conditions which must prevail when thermodynamic equilibrium is established. The factor A is less than unity if some incident radiation is reflected, but applications where reflection is negligible or a separate reflection correction is computed, will be specifically considered herein. Of prime interest in this discussion is the situation where the factor A is less than unity because some of the radiation passes through to reach subsequent bodies or layers in the same body. Consider a body with a large number of identical layers, each of which absorbs one-half the radiation intensity incident at its depth. Then the amount absorbed by layers 1, 2, ..., n, ... would be $$\tfrac{1}{2}, \tfrac{1}{4}, \tfrac{1}{8}, \ldots, \tfrac{1}{2^n}, \ldots$$

because each layer receives one-half as much radiation as the preceding layer. Now, when emission is considered, each layer emits equally at one-half the "black-body" rate corresponding to temperature T. However, as viewed from the outside, the first layer contributes fully, but one-half of the radiation from layer 2 is absorbed in passing through layer 1 for a net contribution of $\tfrac{1}{4}$. The relative amount contributed to emission to the outside by layers 1, 2, 3, ..., n, ... would be $$\tfrac{1}{2}, \tfrac{1}{4}, \tfrac{1}{8}, \ldots, \tfrac{1}{2^n}, \ldots$$

When all these fractions, which represent emission relative to a perfect "black-body" are summed, the total is the same as for a normal "black-body." Thus, for a surface in which radiation is gradually absorbed with increasing depth, the emission is still that of an ideal "black-body" at temperature T provided that all absorbing layers are at the same temperature T. When temperature is measured with pyrometer or infrared cameras, the depth in which the radiation is absorbed is generally very small, so the assumption of uniform temperature is very good. The microwave radiometer, however, has found application to situations where the temperature cannot be assumed uniform throughout the range of depth where the radiation is absorbed.

Suppose, in the example of the preceding paragraph, that the absolute temperatures of layers 1, 2, ... were $T_1, T_2, \ldots$ As was already mentioned, the microwave radiation intensity is proportional to the absolute temperature, so the contribution from the nth layer must be proportional to $T_n$, and the relative emission from layers 1, 2, 3, ..., n, ... is $$T_1/2, T_2/4, T_3/8, \ldots, T_n/n, \ldots$$

The sum of the above series would predict a total emission corresponding to an apparent "black-body" temperature $T_a$, where $$T_a = \tfrac{1}{2}T_1 + \tfrac{1}{4}T_2 + \tfrac{1}{8}T_3 + \ldots + \tfrac{1}{2^n}T_n + \ldots$$

The temperature $T_a$ is a weighted average of the temperature of the various layers, the first layer having a weight of one-half, the second one-fourth, and so forth. Suppose, by utilizing a different band of frequencies, the relative absorption in (and emission from) the layers is altered, say one-fourth is absorbed in each layer. Then the total emitted radiation corresponds to an apparent temperature given by $$T_b = \tfrac{1}{4}T_1 + \tfrac{3}{4}(\tfrac{1}{4})T_2 + \tfrac{3}{4}(\tfrac{3}{4}\cdot\tfrac{1}{4})T_3 + \ldots + (\tfrac{3}{4})^{n-1}\cdot\tfrac{1}{4}T_n + \ldots$$

$$T_b = \tfrac{1}{4}T_1 + 3/16 T_2 + 9/64 T_3 + \ldots$$

Notice that the relative weights of successive layers are different; deep layers contribute more heavily in $T_b$ than $T_a$. In an article entitled "Atmospheric Absorption Measurements With a Microwave Radiometer", *Physical Review*, Volume 70, Nos. 5 and 6, Sept. 1 and 15, 1946, pages 340 to 347, R. H. Dicke and collaborators reported a demonstration of this effect using a microwave radiometer arrangement directed toward the atmosphere. The temperature as a function of altitude was independently determined with balloon-borne radiosondes. Three frequency bands were employed which suffered different amounts of absorption due to the presence of water vapor. They demonstrated that the observations taken at several zenith angles were in accord with the above analysis of a partially-absorbing body. Later workers pointed out that if one had a series of apparent temperatures $T_a, T_b, \ldots$ corresponding to different relative absorption in the atmosphere, the temperature $T_1, T_2, \ldots$ of successive layers could be obtained. See, for example, Louis D. Kaplan, "Inference of Atmospheric Structure From Remote Radiation Measurements," *Journal of the Optical Society of America*, Volume 49, No. 10, October 1959, pages 1004 to 1007; A. H. Barrett and V. K. Chung, "A Method for the Determination of High Altitude Water Vapor Abundance From Ground-Based Microwave Observations," *Journal of Geophysical Research*, Volume 67, 1962, pages 4259 et seq.; and M. L. Meeks and A. E. Lilley, "The Microwave Spectrum of Oxygen in the Earth's Atmosphere", *Journal of Geophysical Research*, Volume 68, No. 6, Mar. 15, 1963, pages 1683 to 1703. This topic has been of considerable interest for remote sensing of the atmosphere, and mathematical techniques for going from the directly measured $T_a, T_b, \ldots$ to the inferred temperature distribution $T_1, T_2, \ldots$ as a function of depth have been extensively devloped. See, for example, S. Twomey, *Introduction to the Mathematics of Inversion in Remote Sensing and Indirect Measurements* (Elsevier, Amsterdam, 1977).

In the field of acoustic or elastic waves, the analog of "black-body" radiation is generally called thermal noise or mechanical Nyquist noise. The mathematical development of the theory is almost identical to the electromagnetic radiation case. The electromagnetic theory begins with consideration of radiation in an empty cavity inside a body of temperature T. The emphasis tends to be with calculation of the radiation emitted and absorbed at the wall; they must exactly balance if there is thermal equilibrium. The acoustic theory generally considers a volume of fluid of finite volume in a container at temperature T. In analogy with electromagnetic waves in the "black-body" cavity, the acoustic waves are generally visualized as travelling across the volume without attenuation. Since the basic results, such as the radiation energy passing through a surface, are independent of attenuation, provided the temperature is everywhere the same, it is simplest to analyze the case of no attenuation.

If attenuation is present in an acoustic medium, then the apparent temperature derived from measuring the thermal noise intensity would be a weighted average of the contributions from various depths just as described above for the microwave radiometer. The detection device of the acoustic radiometer should be designed with a directional beam-like sensitivity pattern so that the received noise power would be directly proportional to the apparent temperature, just as it was for the microwave radiometer. Such a directional acoustic receiver may consist of focussing mirrors and/or lenses in combination with a suitable geometric shape for the transducer device which converts changes of acoustic pressure and velocity into electrical voltages and currents for subsequent amplification and measurement.

The unique capabilities of an acoustic radiometer temperature sensing system result from the acoustic attenuation versus frequency characteristics of a wide variety of materials, and from the short wave length of the acoustic radiation in the useful range of frequencies. For all materials, the attenuation is small at low frequencies, and increases with frequency; thus, any desired amount of attenuation can be selected by choosing the appropriate frequency. Many liquids exhibit "classical" absorption which is proportional to frequency squared. Over limited ranges of frequencies, many materials have an acoustic attenuation directly proportional to the frequency. This is true, for example, for most polycrystaline metals and for most soft tissues of the human body. One convenient way to characterize attenuation is to specify the distance in which the wave amplitude is attenuated by some specified fraction (usually 1/e). Since the intensity is proportional to the amplitude squared, the intensity would be reduced by $1/e^2$ in one attenuation length.

As a specific numerical example, consider the case already discussed: the attenuation length of the radiation determining $T_a$ is 2.9 layers and for $T_b$, 7.0 layers. Clearly, if information is needed in the range of 1 to 10 layers, the most useful frequencies at which measurements should be taken for $T_a$, $T_b$ . . . are those with attenuation lengths ranging from 1 to 10 layers. If the attenuation length is very short, only the surface temperature is measured; if very long, depths much beyond the layers of interest contribute to the result.

Consider the specific example of medical applications of the invention. It is well established that attenuation of ultrasound in body tissue is proportional to frequency, so that one can write the contribution of thermal noise power by the layer between x and dx as $kbf \cdot T(x) \exp(-bfx)dx$, where k is the Boltzmann constant, b is a constant characteristic of tissue (a typical value for soft tissue is $b=0.2(\text{cm-MHz})^{-1}$), f is the frequency, and $T(x)$ is the temperature at depth x. From this expression, one can show that this layer makes its maximum contribution to the received noise power at a frequency $f(\max)=1/(bx)$. At a lesser depth, the maximum is located at a higher frequency. This is the basis of the connection between the temperature distribution with depth x and the power spectrum with frequency f. The important range of frequencies is given by the expression for $f(\max)$.

Suppose the temperature distribution is desired to a depth of 16 cm. in soft tissue. Then the lowest frequency $f_1$ approximately equals $1/(0.2)(16)=0.3$ MHz. The smallest distance is determined by the fact that large thermal gradients are not expected in tissues due to limits on the magnitudes of possible heat sources and sinks: 0.5 cm. might be reasonable corresponding to the highest frequency $f_2=1/(0.2)(0.5)=10$ MHz. Since the wavelength $\lambda=c/f$, where c is the velocity of sound ($c \simeq 0.15$ cm/$\mu$ sec in soft tissue), $\lambda_1 \simeq 0.5$ cm. and $\lambda_2 \simeq 0.015$ cm. This is very convenient since any device to create a directional beam sensitivity pattern must have dimensions large compared to a wavelength. This being the case, a diameter $d \simeq 5$ cm. of the acoustic transducer might be conveniently selected. The frequencies involved are also conveniently high so that the measurement time is not too long. When measuring a noise spectrum with an acoustic radiometer, the fractional error in measuring absolute temperature T is $1/[\tau \Delta f]^{\frac{1}{2}}$, where $\tau$ is the measuring time and $\Delta f$ is the frequency bandwidth of the radiometer. The largest possible value for $\Delta f$ is $\Delta f = f$. If $\tau = 100$ seconds, $\Delta f = 1$ MHz, then the fractional error is $10^{-4}$. If $T = 310°$ K. (body temperature), then the temperature error would be 0.031° K. in the apparent temperature.

Consider now why electromagnetic "black-body" radiation could not be used for the same purpose. In order to be useful for body temperature measurements, the diameter of the beam pattern must be no more than, say, 5 cm. The directional receiving antenna must be this size, or smaller. Since the wavelength must be less than the dimensions of the directional antenna, $\lambda << 5$ cm. For such electromagnetic radiation, the attenuation length in soft tissue is too short.

For materials in which attenuation is proportional to frequency, the attenuation length is a fixed multiple of the wavelength. For example, using the numbers given above for tissue, this ratio $R=67$. In many materials of geophysical interest, $R \approx 100$ to 500. It can be seen from the manner in which R was calculated that it corresponds to the number of cycles of oscillation for the wave motion to decrease to 1/e of its original amplitude. Whatever the value of R, if large attenuation lengths are desired in order to sense temperature to great depth, one must utilize frequencies which correspond to long wavelengths ($\lambda = $(depth of interest)/R). Since $f=c/\lambda$, where c is the acoustic or elastic wave velocity in the medium of interest, this means going to low frequencies. At least two difficulties may arise:

(1) The time required to obtain a given temperature precision will increase as 1/f.

(2) The noise background from other sources (wind, surf, seismic activity, human activity) may increase.

These considerations will limit the depths to which temperature can be sensed by acoustic radiometry in the natural environment.

The invention may be embodied in acoustic radiometer systems of varying degrees of complexity, depending on the application. The simplest as shown in FIG. 1 is a single probe system. More specifically, a transducer 10 such as a piezoelectric disc is adapted to be coupled to the body 11 under observation by means of an acoustic coupling 12. If the acoustic impedance of body 11 is Z, then the acoustic coupling 12 which may be aliquid or other suitable medium is chosen to have a matching acoustic impedance of approximately Z. Further, the transducer is provided with a backing 13. The thickness of the transducer 10 and the transducer backing 13 are chosen either for broad-band response with the lowest resonant frequency of the transducer system above 10 MHz for the specific example described above, or for more efficient coupling by means of band-pass response with one or more resonant frequencies within one or more pass bands in the 0.3-10 MHz region for the specific example described above. If the diameter of the transducer is 5 cm., then an approximately parallel "beam" having the 5 cm. diameter describes a region 14 of tissue in which the temperature would be measured. If the transducer face were curved or an acoustic lens were inserted, the "beam" could be focussed at any specified depth and the diameter of the temperature monitored region would vary with depth x. A variation of the basic system is shown in FIG. 2 wherein an acoustic lens is interposed between the transducer 10 and the acoustic coupling media at 12. The acoustic lens comprises a high-velocity acoustic media 15 in contact with the transducer face. The high-velocity acoustic media 15 has a generally plano-convex shape. Another high-velocity acoustic media 16 contacts the acoustic coupling media 12. This high-velocity acoustic media 16 has the general shape of a negative miniscus lens. The two high-velocity acoustic media 15 and 16 are connected by a low-velocity acoustic media 17 having a generally frusto-conical shape. This acoustic lens assembly produces a parallel wave front of diameter D having a magnification $m=D/d$, where d is the diameter of the transducer 10. Obviously, acoustic lens systems can be designed to produce converging as well as collimated beams. A further variation of the basic system shown in FIG. 1 is illustrated in FIG. 3. In this case, the transducer 10 is located at the focal point of a parabolic reflector 18. The parabolic reflector 18 may be filled with an acoustic coupling fluid and thereby perform the function of the acoustic coupling medium 12 as well as a focussing function. Again, the arrangement shown in FIG. 3 produces a parallel wave front having a diameter D in the body with a magnification $m=D/d$.

The output of transducer 10 is connected to a preamplifier 19 to provide an amplified electrical noise spectrum signal to a power spectrum analyzer 20. In the simplest case, only a single frequency band would be analyzed. This would provide a single weighted-average temperature measurement. Such a system might be suitable for some process control applications where the shape of the temperature distribution is known fom other considerations, but a temperature which is related to internal temperature is needed. On the other hand, the spectrum analyzer 20 would analyze a broader spectrum of frequencies to give temperature-depth profiles in which the depth resolution limit increases (becomes poorer) in direct proportion to the depth.

The basic system can be made more complex by adding an additional acoustic transducer as shown in FIG. 4. In this system, the two acoustic transducers 21 and 22 are placed on opposite surfaces of the same body, facing each other. This arrangement greatly improves the depth resolution and the precision of the temperature measurements. Carrying the system shown in FIG. 4 one step further, a plurality of acoustic transducers are arranged about the peripheral surface of the body to view the same planar section of the body. Each would be placed at a different position around the perimeter of the section, and the data from all of the acoustic transducers and frequencies could then be combined to provide a two-dimensional temperature profile map of the section. For purposes of simplifying the description, however, the two acoustic transducer systems shown in FIG. 4 will be understood to represent, in principle, a typical multi-transducer system. The outputs of the acoustic transducers 21 and 22 are connected to respective preamplifiers 23 and 24 which amplify the outputs of the transducers. It is important to appreciate that the electrical "noise" voltage generated by the acoustic transducers must be amplified without introducing a significant amount of additional noise to the power level suitable for typical commercially-available spectrum analyzers (about $-100$ dbm into 50 ohms). The amount of additional amplifier noise which can be tolerated is thus dictated in part by the precision required in the system and the available electronics. Alternatively, the effect of amplifier noise can be subtracted by alternately switching the input between the acoustic transducer and a known noise source, such as an electrical wire-wound resistance at a known temperature. This approach is illustrated in FIG. 4 wherein a noise source 25 has an output supplied to a preamplifier 26. The outputs of each of the preamplifiers 23, 24 and 26 are connected to a switching device 27 such as multiplexer. While switching device 27 is illustrated as a mechanical switch following the preamplifiers 23, 24 and 26, those skilled in the art will understand that the switching device may be conveniently made of solid state switches using, for example, MOS technology and that the switch may be inserted before the preamplification. The switching device 27 can be operated to selectively connect the outputs of preamplifiers 23, 24 and 26 to the power spectrum analyzer 28. The order in which the outputs of the preamplifiers 23, 24 and 26 are connected to the power spectrum analyzer 28 is not necessarily sequential. Besides providing a compensation for the effects of amplifier noise, the reference noise source 25 can also make possible a relative temperature measurement as opposed to an absolute temperature measurement. It will, of course, be appreciated that the use of a reference noise source 25 is not limited to a multi-transducer system, but may also be used to equal advantage in a single transducer system such as that shown in FIG. 1.

The output of the power spectrum analyzer 28 may be subjected to further signal processing. For example, the output of the power spectrum analyzer 28 could be supplied to a microprocessor 29 programmed with a mathematical inversion algorithm of the type described by S. Twomey referenced above. In a multi-transducer system, the data from each transducer can be assembled and processed in a manner analogous to axial tomography presently used in X-ray imaging. The output of either the power spectrum analyzer 28 or the microprocessor 29 can be displayed by a display 30, such as a cathode ray tube, and/or recorded by recorder 31, such as a printer or magnetic medium recorder. In many cases where the temperature profile might indicate abnormal or diseased tissue, comparison spectra could be taken at a symmetrical location on the same individual.

Soft tissue has been mentioned in the above discussion because its acoustic characteristics are fairly uniform, and very little acoustic energy is reflected at boundaries between different layers or types of tissue. Even where bone or air, with very different acoustic characteristics, is located within the transducer "beam," it is still true that a uniform temperature must result in a flat spectrum. However, when temperature is not uniform, reflections at large acoustic impedance discontinuities can effect the apparent temperature distribution inferred from the noise power spectrum. The presence of any such large impedance discontinuities could be detected by utilizing the acoustic transducer in a conventional pulse-echo diagnostic ultrasound mode. The temperature profiles also could be displayed by all the techniques employed for conventional diagnostic ultrasound. Superposition of both types of information would aid in compensating for the effects of inhomogenities and would give more diagnostic information than either display alone.

The diagnostic usefulness of temperature measurements by probe inserted in body cavities is well known. This invention extends diagnostic temperature measurements to all parts of the body consisting primarily of soft tissue. The invention has therapeutic applications to monitor temperature changes in almost any procedure involving heating or cooling of body tissues. If heat energy is introduced to a small region of the body by focussed ultrasound or other means, monitoring the subsequent change of temperature with time by means of this invention would measure the perfusion, another diagnostically useful quantity.

While the invention has been described with specific reference to preferred embodiments, those skilled in the art will understand that these embodiments illustrate the principles of the invention, and the invention is not limited in its practice to these particular embodiments. For example, while a piezoelectric transducer was specifically described, other mechanical vibrations to electrical signal transducers may be used with equal effect. These would include recently developed transducers employing fiber optics and lasers to first convert the mechanical vibrations to an optical signal or modulation which, in turn, is converted to an electrical signal. See, for example, J. H. Cole et al., "Fiber Optic Detection of Sound", *Journal of the Acoustical Society of America,* Vol. 62, 1977, pp. 1302 to 1304; and B. Culshaw et al., "Acoustic Sensitivity of Optical Fiber Waveguide," *Electronic Letters,* Vol. 13, 1977, pp. 760 and 761. Broadly, what the invention provides is a way to non-invasively measure temperature inside the living as well as inanimate bodies by means of detecting ultrasonic noise. By measuring the noise power spectrum over a suitable frequency range, the temperature-depth distribution along a well-defined path can be determined. The invention provides an absolute temperature measurement, as well as a means for relative temperature comparison.

W claim:

1. A passive remote temperature sensor system for non-invasive temperature measurement of the interior of a body, said system comprising at least one acoustic transducer adapted to be coupled with the surface of said body for intercepting an acoustical noise signal from within the interior of said body and generating a corresponding electrical signal, and power spectrum analyzer means connected to receive said electrical signal for analyzing at least one frequency component of said electrical signal to provide a measure of the temperature over a predetermined depth region within the interior of said body.

2. A passive remote temperature sensor system as recited in claim 1, further comprising means for focussing said acoustical noise signal on said acoustic transducer.

3. A passive remote temperature sensor system as recited in claim 2, wherein said means for focussing is an acoustic lens interposed between said acoustic transducer and said body.

4. A passive remote temperature sensor system as recited in claim 2, wherein said means for focussing is a conic-section reflector, said acoustic transducer being located at the focal point of said conic-section reflector.

5. A passive remote temperature sensor system as recited in claim 1, wherein said acoustic transducer is large in comparison with the wavelength of said one frequency component in said body.

6. A passive remote temperature sensor system as recited in claim 1, wherein said power spectrum analyzer means analyzes the noise power spectrum over a range of frequencies to develop an output representing the temperature-depth distribution along a path within the interior of said body, said system further comprising display means for displaying the output of said power spectrum analyzer means.

7. A passive remote temperature sensor system as recited in claim 1, wherein said power spectrum analyzer means analyzes the noise power spectrum over a range of frequencies to develop an output representing the temperature-depth distribution along a path within the interior of said body, said system further comprising recording means for recording the output of said power spectrum analyzer means.

8. A passive remote temperature sensor system as recited in claim 1, comprising two acoustic transducers adapted to be coupled with the surface of said body on opposite sides thereof in facing relation, and switch means for selectively coupling said transducers to said power spectrum analyzer means.

9. A passive remote temperature sensor system as recited in claim 8, wherein said power spectrum analyzer means analyzes the noise power spectrum over a range of frequencies to develop an output representing the temperature-depth distribution along a path within the interior of said body, said system further comprising display means for displaying the output of said power spectrum analyzer means.

10. A passive remote temperature sensor system as recited in claim 8, wherein said power spectrum analyzer means analyzes the noise power spectrum over a range of frequencies to develop an output representing the temperature-depth distribution along path within the interior of said body, said system further comprising recording means for recording the output of said power spectrum analyzer means.

11. A passive remote temperature sensor system as recited in claim 8, further comprising a reference noise source, said switching means selectively coupling said transducers and said reference noise source to said power spectrum analyzer means.

12. A passive remote temperature sensor system as recited in claim 1, comprising a plurality of acoustic transducers adapted to be coupled with the surface of said body in a common plane about the periphery thereof, and switch means for selectively coupling said transducers to said power spectrum analyzer means.

13. A passive remote temperature sensor system as recited in claim 12, wherein said power spectrum analyzer means analyzes the noise power spectrum over a range of frequencies to develop an output representing the temperature-depth distribution over a section of said body defined by said common plane, said system further comprising display means for displaying the output of said power spectrum analyzer means.

14. A passive remote temperature sensor system as recited in claim 12, wherein said power spectrum analyzer means analyzes the noise power spectrum over a range of frequencies to develop an output representing the temperature-depth distribution over a section of said body corresponding to said common plane, said system further comprising recording means for recording the output of said power spectrum analyzer means.

15. A passive remote temperature sensor system as recited in claim 12, further comprising a reference noise source, said switch means selectively coupling said transducers and said references noise source to said power spectrum analyzer means.

16. A passive remote temperature sensor system as recited in claim 1, further comprising a reference noise source, and switch means for selectively coupling said acoustic transducer and said reference noise source to said power spectrum anaylizer means.

17. A method of passive non-invasive temperature measurement of the interior of a body using the acoustic thermal noise spectrum of said body, said method comprising the steps of:

receiving said acoustic thermal noise spectra along a well-defined path within the interior of said body,
converting the received acoustic thermal noise spectra into a corresponding electrical signal, and
analyzing the noise power spectra of said electrical signal to develop an output representing the temperature-depth distribution along said path.

18. A method of non-invasive temperature measurement as recited in claim 17, further comprising the step of receiving said acoustic thermal noise spectra along at least a second well-defined path within the interior of said body, said paths being in a common plane.

19. A method of non-invasive temperature measurement as recited in claim 17, further comprising the step of comparing the noise power spectra of said electrical signal with a reference noise source.

20. A method of passive non-invasive temperature measurement of the interior of a body using the acoustic thermal noise spectrum of said body, said method comprising the steps of:

receiving said acoustic thermal noise spectra along a well-defined path within the interior of said body,
converting the received acoustic thermal noise power in a selected frequency band into a corresponding electrical signal, and
converting the electrical signal to an output representing an average temperature along said path within said body.

21. A method of non-invasive temperature measurement as recited in claim 20, further comprising the step of receiving said acoustic thermal noise spectra along at least a second well-defined path within the interior of said body, said paths being in a common plane.

22. A method of non-invasive temperature measurement as recited in claim 20, further comprising the step of comparing the noise power spectra of said electrical signal with a reference noise source.

* * * * *